United States Patent Office 3,505,671
Patented Apr. 7, 1970

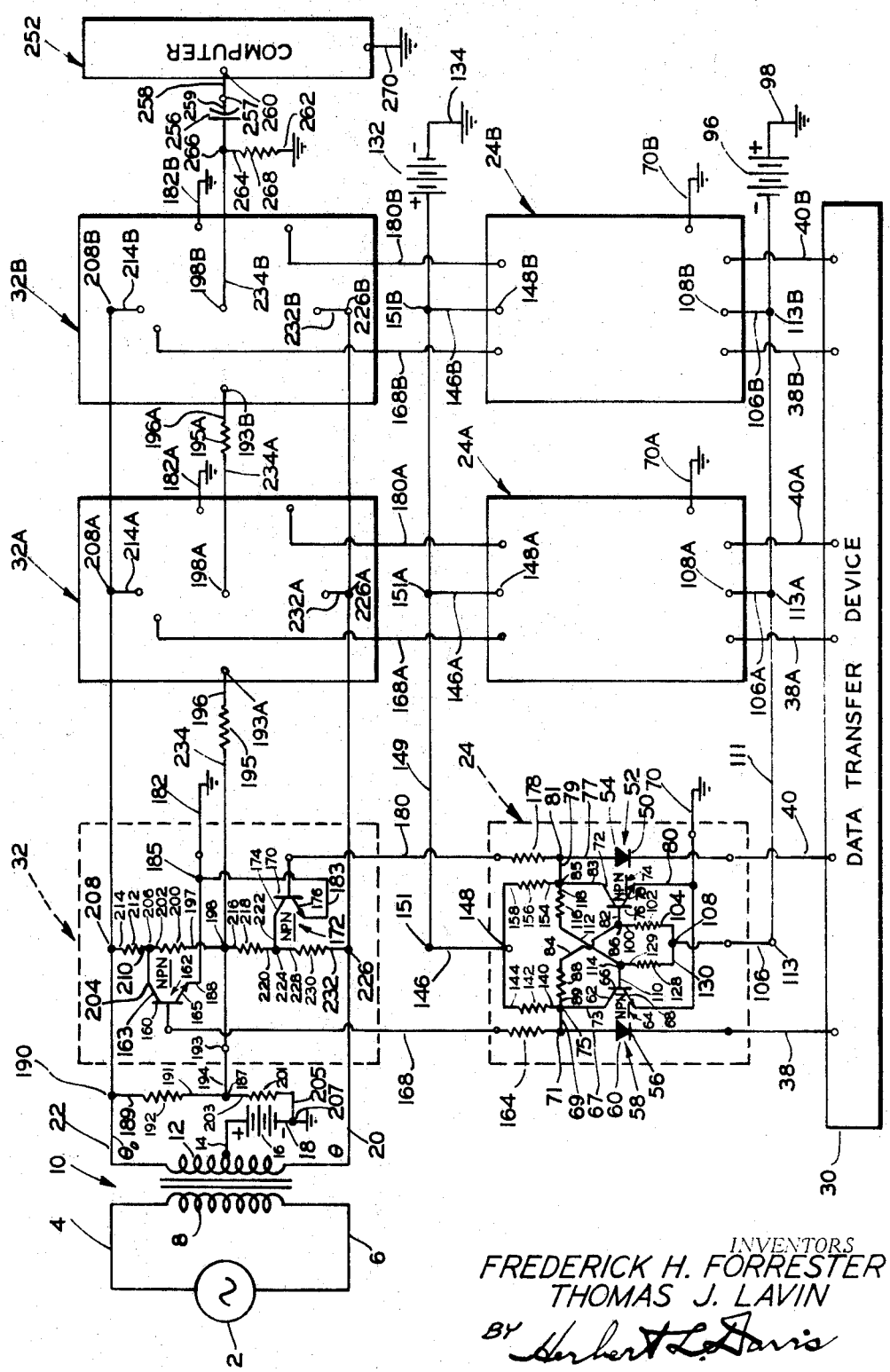

3,505,671
DIGITAL TO ANALOG CONVERTER
Frederick H. Forrester, Paterson, and Thomas J. Lavin, Midland Park, N.J., assignors to The Bendix Corporation, a corporation of Delaware
Filed Dec. 30, 1965, Ser. No. 517,746
Int. Cl. G08c 9/00, 11/00; H04l 3/00
U.S. Cl. 340—347                                  7 Claims

ABSTRACT OF THE DISCLOSURE

A digital to analog converter including switching means excited by a direct current referenced bi-phase alternating voltage and driven by a signal corresponding to digital data for providing an alternating current output proportional to the digital data.

---

This invention relates to digital to analog converters and, more particularly, to a converter for providing alternating current outputs proportional to digital data.

In flight control systems, or other digitally connected servo systems using alternating current carrier signals for the transmission of data, the device for converting the data to analog signals must be capable of operating at high speeds and with a high degree of accuracy. Moreover, in consideration of the space limitations in modern flight and space vehicles, it is imperative that micro-circuitry is used and the need for space consuming translaters or gain adjustment stages is eliminated. A device constructed in accordance with the present invention provides novel means for accomplishing these tasks.

An object of this invention is to provide a digital to analog converter for converting digital data to alternating current voltages.

Another object of this invention is to provide an analog to digital converter using a bi-phase alternating current voltage and a switching network to provide amplitude controlled alternating current outputs corresponding to digital data.

Another object of this invention is to provide, in a digital to analog converter, means responsive to a bi-phase alternating current reference voltage for providing high levels of alternating current output while being driven by low level micro-circuitry.

Another object of this invention is to provide in an analog to digital converter, a direct current driven switching arrangement for providing alternating current outputs without intermediate modulating circuitry.

This invention contemplates a converter for providing an analog output proportional to digital data comprising; means for providing a signal input corresponding to the digital data; means for providing a bi-phase alternating current reference voltage; switching means excited by the alternating current reference voltage; and means responsive to the signal input for driving the switching means to provide an alternating current output proportional to the digital data.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

In the drawing:

The single figure in the drawing represents a digital to analog converter in accordance with the present invention.

In reference to the figure, a reference voltage is supplied by a suitable source of alternating current 2. Alternating current source 2 is coupled through an output conductor 4 and an output conductor 6 to a primary winding 8 of a transformer 10. Primary winding 8 is inductively coupled to a secondary winding 12 of transformer 10, with secondary winding 12 having a center tap conductor 14 connected to a positive terminal of a suitable source of direct current shown as a battery 16. The negative terminal of battery 16 is connected to a ground conductor 18.

Transformer 10 transforms the output of alternating current source 2 to a bi-phase voltage with each of the phases being 180° apart. Battery 16 provides a direct current reference level for the bi-phase voltage to avoid the need for bi-lateral transistors and to permit the use of conventional transistors as switches. Secondary winding 12 of transformer 10 has one leg connected to a conductor 20 carrying voltage of phase $\theta$ and the other leg connected to a conductor 22 carrying voltage of phase $\theta_0$, with the voltage of phase $\theta$ differing in phase from the voltage of phase $\theta_0$ by 180°.

The analog to digital converter in accordance with the present invention includes a plurality of bi-stable multivibrators, commonly referred to in the art as flip-flops, shown herein for purposes of illustration as being three in number, such as the flip-flop 24 shown in detail and the flip-flops designated generally by the numerals 24A and 24B of a type similar to flip-flop 24. It is not deemed necessary at this time to describe in detail the flip-flops 24A and 24B in which parts corresponding to parts of flip-flops 24 have been indicated by the numerals bearing the suffixes A and B, respectively. Although flip-flops 24, 24A and 24B are shown in parallel arrangement, it is to be noted that a serial arrangement would also be adaptable to a device constructed in accordance with the present invention.

Signals corresponding to bits of digital data are distributed from a data transfer device 30 to flip-flops 24, 24A and 24B. Data transfer device 30 may be of a conventional type which applies signals corresponding to the bits of data to flip-flops 24, 24A and 24B in accordance with a predetermined data program. For example, flip-flops 24, 24A and 24B may be arranged so as to be set in one stable state when a signal corresponding to the bit "1" is applied, and to be triggered to the other stable state when a signal corresponding to the bit "0" is applied.

Flip-flops 24, 24A and 24B drive corresponding switching circuits shown in detail as a switching circuit 32 and the switching circuits designated generally by the numerals 32A and 32B of a type similar to switching circuit 32, which provide analog voltages of either phase $\theta$ or phase $\theta_0$ corresponding to the digital input from transfer device 30, at an output terminal 257 of the switching network comprising switching circuits 32, 32A and 32B. It is not deemed necessary at this time to describe in detail the switching circuits 32A and 32B in which corresponding parts of switching circuit 32 have been indicated by like numerals bearing the suffix A and B, respectively.

The analog voltage which may be effected at output terminal 257 of the switching network may be varied in accordance with the various variations of a three bit binary word applied to flip-flips 24, 24A and 24B in a typical data program represented, for purposes of illustration, as follows, wherein the most significant bit is applied to flip-flop 24B and used as a sign bit:

| Binary Word | Data Bit Applied To Flip-Flop | | | Voltage | Phase |
|---|---|---|---|---|---|
| | 24B | 24A | 24 | | |
| 000 | 0 | 0 | 0 | 8 | $\theta_0$ |
| 001 | 0 | 0 | 1 | 6 | $\theta_0$ |
| 010 | 0 | 1 | 0 | 4 | $\theta_0$ |
| 011 | 0 | 1 | 1 | 2 | $\theta_0$ |
| 100 | 1 | 0 | 0 | 0 | |
| 101 | 1 | 0 | 1 | 2 | $\theta$ |
| 110 | 1 | 1 | 0 | 4 | $\theta$ |
| 111 | 1 | 1 | 1 | 6 | $\theta$ |

3

Digital data signals are applied to flip-flop 24 through output conductors 38 and 40 of data transfer device 30. Conductor 38 is connected to a cathode 56 of a diode 58 having an anode 60, and conductor 40 is connected to a cathode 50 of a diode 52 having an anode 54.

Anode 60 of diode 58 is connected to a collector 62 of an NPN type transistor 64 having a base 66 and an emitter 68. The anode 60 is connected to the collector 62 through a conductor 67, a conductor 69 joining conductor 67 at a point 71, and a conductor 73 joining conductor 69 at a point 75. Emitter 68 of transistor 64 is connected to a common grounded connector 70.

Anode 54 of diode 52 is connected to a collector 72 of an NPN type transistor 74 having a base 76 and an emitter 78. The anode 54 is connected to the collector 72 through a conductor 77, a conductor 79 joining conductor 77 at a point 81, and a conductor 83 joining conductor 79 at a point 85. Emitter 78 of transistor 74 is connected to the common grounded connector 70 through a conductor 80 joining conductor 70.

The base 76 of the transistor 74 is connected to anode 60 of diode 58 through a conductor 82, a conductor 84 joining conductor 82 at a point 86, a resistor 88, a conductor 89 joining the conductor 69 at the point 75, and the conductor 67 joining the conductor 69 at the point 71. The base 76 of the transistor 74 is further connected to the negative terminal of a suitable source of direct current shown as a battery 96 through the conductor 82 joining a conductor 100 at the point 86, a resistor 102, a conductor 104, a conductor 106 joining conductor 104 at a point 108 and a conductor 111 joining conductor 106 at a point 113 and leading to the negative terminal of the battery 96. The battery 96 has a positive terminal connected to a common ground through a conductor 98.

The base 66 of the transistor 64 is connected to the anode 54 of the diode 52 through a conductor 110, a conductor 112 joining conductor 110 at a point 114, a resistor 116, a conductor 118 joining the conductor 79 at the point 85, and the conductor 79 joining the conductor 77 at the point 81. The base 66 of the transistor 64 is further connected to the negative terminal of the battery 96 through a conductor 129 joining the conductor 110 at the point 114, a resistor 128, a conductor 130 joining the conductor 106 at the point 108 and the conductor 106 joining the conductor 111 at the point 113.

The collector 62 of the transistor 64 is connected to the positive terminal of a suitable source of direct current shown as a battery 132 through the conductor 73, a conductor 140 joining the conductor 73 at the point 75, a resistor 142, a conductor 144, a conductor 146 joining conductor 144 at a point 148 and a conductor 149 joining conductor 146 at a point 151 and leading to the positive terminal of the battery 132. The battery 132 has a negative terminal connected to ground through a conductor 134. The collector 72 of the transistor 74 is connected to the positive terminal of the battery 132 through the conductor 83, a conductor 154 joining the conductor 83 at the point 85, a resistor 156, a conductor 158 joining the conductor 146 at the point 148 and thereby through the conductor 149 to the positive terminal of the battery 132.

The anode 60 of the diode 58 is further connected to a base 160 of an NPN type transistor 162 in switching circuit 32. Transistor 162 has a collector 163 and an emitter 165. The anode 60 is connected through the conductor 67, a resistor 164 and a conductor 168 to the base 160 of the transistor 162. The anode 54 of diode 52 is also connected to a base 170 of an NPN type transistor 172 in switching circuit 32. Transistor 172 has a collector 174 and an emitter 176. The anode 54 is connected through the conductor 77, a resistor 178 and a conductor 180 to the base 170 of the transistor 172. The emitter 176 of the transistor 172 is connected to a grounded conductor 182 through a conductor 183 joining conductor 182 at a point 185, while the emitter 165 of transistor 162 is

4 connected to the grounded conductor 182 through a conductor 188 joining conductor 182 at the point 185.

The secondary winding 12 of the transformer 10 is connected to the collector 163 of the transistor 162 through a conductor 189 joining the conductor 22 at a point 190, a resistor 192, a conductor 191 joining a conductor 194 at a point 187, with conductor 194 leading to a terminal 193 and therefrom to a point 198, a conductor 197 joining conductor 194 at the point 198, a resistor 200, a conductor 202, and a conductor 204 joining connector 202 at a point 206 and leading to the collector 163. Collector 163 is further joined to the conductor 22 at a point 208 through a conductor 210 joining conductor 204 at the point 206 and leading through a resistor 212 and a conductor 214 to the point 208 on conductor 22.

Secondary winding 12 of transformer 10 is further connected to the collector 174 of the transistor 172 through the conductor 189, the resistor 192, the conductor 191 joinning the conductor 194 at the point 187, the conductor 194, with the conductor 194 leading to the terminal 193 and therefrom to the point 198, a conductor 216 joining the conductor 194 at the point 198, a resistor 218, a conductor 220, and a conductor 222 leading to the collector 174 from a point 224 on conductor 220. Collector 174 is further connected to the conductor 20 of secondary winding 12 at a point 226 through a conductor 228 joining conductor 222 at point 224, a resistor 230 and a conductor 232 leading to the point 226 on conductor 20.

A resistor 201 is joined to the conductor 191 and the conductor 194 at the point 187 through a conductor 203, and connected to grounded conductor 18 through a conductor 205 joining grounded conductor 18 at a point 207.

An output conductor 234 is connected to point 198 to which lead the conductors 194, 197 and 216 as heretofore explained, and the output conductor 234 leads from the point 198 of the switching circuit 32 to an input terminal 193A of the switching circuit 32A through a resistor 195 and a conductor 196. A similar output conductor 234A leads from the point 198A of switching circuit 32A to the input terminal 193B of the switching circuit 32B, through a resistor 195A and a conductor 196A, while an output conductor 234B leads from the point 198B of the switching circuit 32B.

Flip-flops 24A and 24B, as heretofore explained, receive signals corresponding to bits of digital data from data transfer device 30 through conductors 38A and 40A and conductors 38B and 40B, respectively. The flip-flops 24A and 24B are further connected at respective points 108A and 108B through respective conductors 106A and 106B to the points 113A and 113B on conductor 111 leading to the negative terminal of the battery 96. Flip-flop 24A is connected to a grounded conductor 70A and flip-flop 24B is connected to a grounded conductor 70B.

Flip-flops 24A and 24B are connected to switching circuits 32A and 32B, respectively, through conductors 168A and 180A and conductors 168B and 180B. Switching circuit 32A is connected to a grounded conductor 182A and switching circuit 32B is connected to a grounded conductor 182B.

Flip-flops 24A and 24B are connected at points 148A and 148B to conductor 149 from the positive terminal of battery 132 through a conductor 146A joining conductor 149 at a point 151A and a conductor 164B joining conductor 149 at a point 151B, respectively.

The switching circuit 32A is connected through conductor 232A to the conductor 20 leading from the secondary winding 12 of transformer 10, with the conductor 232A joining the conductor 20 at a point 226A, and connected through the conductor 214A to the conductor 22 leading from secondary winding 12 of transformer 10, with the conductor 22 joining the conductor 214A at a point 208A. The conductors 20 and 22 are connected to the switching circuit 32B through the conductor 232B joining the conductor 20 at the point 226B and the conductor 214B joining the conductor 22 at the point 208B.

The point 198B of switching circuit 32B is coupled to the output terminal 257 of the network comprising switching circuits 32, 32A and 32B through a capacitor 256 and a conductor 259. Conductor 234B is connected through a conductor 264, resistor 268 and conductor 262 to ground. The conductor 264 joins conductor 234B at a point 266. Output terminal 257 is connected to a receiving device such as a computer 252 through a conductor 258 connected to an input terminal 260 of the computer 252, with computer 260 being connected to a grounded conductor 270.

OPERATION

Flip-flops 24, 24A and 24B are of the fixed bias binary type with each flip-flop being arranged to respond to signals corresponding to bits of digital data from transfer device 30, with the bits of data forming a binary word as heretofore noted.

A negative signal corresponding to bit "1" is applied to flip-flop 24 through output conductor 38 of data transfer device 30, with flip-flop 24 arranged so that transistor 64 is rendered conductive and transistor 74 is rendered cut off. When transistor 74 is cut off, there is no current flowing from collector 72 through resistor 156. However, the difference in potential due to the positive bias from battery 132 and the negative bias from battery 96 causes current to flow through resistors 156, 116 and 128, with a voltage drop occuring across resistor 128. The voltage at base 66 of transistor 64 is positive with respect to grounded emitter 68, causing a base current to flow, and the base to emitter resistance of transistor 64 is lowered. Transistor 64 is thus maintained conductive when transistor 74 is cut off, and flip-flop 24 is set in one of its stable states.

When transistor 74 is cut off, base 170 of transistor 172, connected to collector 72 of transistor 74, is biased by transistor 74 so as to cause current to flow between emitter 176 and collector 174 of transistor 172. Transistor 172, connected at collector 174 to phase $\theta$ of alternating current source 2, is thus rendered "on" and blocks an alternating current signal of phase $\theta$ from passing to point 198. Base 160 of transistor 162 is biased by conductive transistor 64 so as to block the flow of current between emitter 165 and collector 163. Transistor 162, connected at collector 163 to phase $\theta_0$ of alternating current source 2, is thus rendered "off" and provides a signal of phase $\theta_0$ at point 198.

A negative signal corresponding to bit "0" is applied to flip-flop 24 through the output conductor 40 of data transfer device 30 to trigger flip-flop 24 to its other stable state. This signal is applied to diodes 52 and 58. With transistor 74 being cut off, diode 52 will direct the negative signal to collector 72 of transistor 74. Diode 58 will not conduct the signal since diode 58 is reverse biased by the current flowing at collector 62 of conductive transistor 64. Collector 72 of transistor 74, thus energized by the signal corresponding to bit "1," is coupled to base 66 of transistor 64 causing base 66 to become negatively charged. The current at collector 62 of transistor 64 is decreased, and the voltage is increased causing base 76 of transistor 74, connected to collector 62, to become more positive. Transistor 74 is thus rendered conductive and transistor 64 is rendered cut-off. Transistor 172 responds to the conductive state of transistor 74 to block current from flowing between emitter 176 and collector 174 of transistor 172 which is thus rendered "off" and hence permits an alternating current signal of phase $\theta$ to pass to point 198. Transistor 162 responds to the "off" state of transistor 64 to permit current flow between emitter 165 and collector 163, thus being rendered "on" to block an alternating current signal of phase $e_0$ from passing to point 198.

The signals so provided are coupled to point 198B, and applied from point 198B to output terminal 257, and therefrom to computer 252 which is coupled to terminal 257 by capacitor 256. The output at output terminal 257 is an analog voltage corresponding to the digital data provided by data transfer device 30.

The resistances in the switching network comprising switching circuits 32, 32A and 32B are selected in proportion to each other so as to provide a predetermined relationship between the input and output alternating current voltages of switching circuits 32, 32A and 32B. If resistors 195 and 195A have values of R, resistors 192 and 201 are selected to have values of 6R and 3R respectively, resistors 200, 212, 218 and 230 are selected to have values of 3R and resistor 268 is selected to have a value of 2R. Such a resistance configuration provides for a shunt switching arrangement of transistors 162 and 172 in switching circuit 32 and the corresponding transistors in switching circuits 32A and 32B thus avoiding the need for bi-lateral transistors.

In a similar manner, flip-flops 24A and 24B respond to signals corresponding to bit "0" and bit "1" to drive switching circuits 32A and 32B so as to provide at points 198A and 198B, respectively, alternating current signals of phase $\theta$ or phase $\theta_0$ so that the combined output at output terminal 257 represents an analog voltage in accordance with the data program as heretofore described.

The steady state accuracy of a converter constructed in accordance with the present invention is improved because the alternating current system permits capacitive coupling through capacitor 256 thereby blocking any direct current voltage errors. The converter is thus rendered particularly adaptable to systems which require data transmission at high accuracy.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A digital to analog converter of the type including first means for providing signals corresponding to bits of digital data forming a binary word, second means for providing an alternating voltage, third means for transforming the alternating voltage into a bi-phase reference voltage and for referencing said bi-phase reference voltage to a direct current level, switching means excited by the direct current referenced bi-phase voltage and means responsive to the signals corresponding to bits of digital data for driving the switching means to provide an alternating current output proportional to the data bits, said last mentioned means including:
    a first transistor having input and output elements and connected at its input element to the first means and responsive to a signal corresponding to a predetermined bit of digital data so that current flows between the input and output elements;
    a second transistor having input and output elements and connected at its input element to the first means and responsive to a signal corresponding to another bit of digital data so that the current flows between the input and output elements;
    the output element of the first transistor being connected to the input element of the second transistor for opposing current flow between the input and output elements of said second transistor; and
    the output elements of the second transistor being connected to the input element of the first transistor for opposing current flow between the input and output elements of the first transistor.

2. A converter as defined by claim 1 wherein the means responsive to the signals corresponding to bits of digital data comprises a plurality of bi-stable multi-vibrators, with each of the multi-vibrators including:
  a first transistor having a base element, a collector element and a grounded emitter element;
  a second transistor having a base element, a collector element and a grounded emitter element;
  the base element of the first transistor being connected to the collector element of the second transistor;
  the base element of the second transistor being connected to the collector element of the first transistor;
  means for applying a negative bias to the base elements of the first and second transistors;
  means for applying a positive bias to the collector elements of the first and second transistors;
  the first transistor being responsive to the positive and negative biases and to a signal corresponding to a predetermined bit of digital data so as to be rendered conductive, causing the second transistor to be rendered cut off, and;
  the second transistor being responsive to the positive and negative biases and to a signal corresponding to another predetermined bit of digital data so as to be rendered conductive causing the first transistor to be rendered cut off.

3. A converter as defined by claim 2 wherein, the switching means includes:
  a third transistor having a base element, a collector element and a grounded emitter element;
  the collector element of the third transistor being connected to the second means;
  the base element of the third transistor being biased by the first transistor so as to provide an alternating current signal of one phase at the collector element of the third transistor when the first transistor is rendered conductive, and to oppose said alternating current voltage when the first transistor is rendered cut off;
  a fourth transistor having a base element, a collector element and a grounded emitter element;
  the collector element of the fourth transistor being connected to the second means, and;
  the base element of the fourth transistor being biased by the second transistor so as to provide an alternating current voltage of another phase at the collector element of the fourth transistor when the second transistor is rendered conductive, and to oppose said alternating current voltage when the second transistor is rendered cut off.

4. A converter as defined by claim 1, wherein the switching means comprises a plurality of switching circuits with each switching circuit including:
  a third transistor having an input element, and having an output element connected to one phase of the bi-phase reference voltage;
  a fourth transistor having an input element, and having an output element connected to the other phase of the bi-phase reference voltage;
  the output element of the first transistor being connected to the input element of the third transistor for providing voltage of the one phase at the output element of the third transistor when current flows between the input and output elements of the first transistor, and for opposing said voltage when current flow in the first transistor is opposed by the second transistor; and
  the output element of the second transistor being connected to the input element of the fourth transistor for providing voltage of the other phase at the output element of the fourth transistor when current flows between the input and output elements of the second transistor, and for opposing said voltage when current flow in the second transistor is opposed by the first transistor.

5. A converter as defined by claim 4 wherein the converter has an output terminal, and each of the switching circuits are serially connected one to the other and include:
  an output conductor;
  the output element of the third transistor in each of the plurality of switching circuits being connected to the output conductor so as to apply an alternating voltage therethrough when the first transistor is connected to the third transistor to provide voltage of the one phase at the output element thereof;
  the output element of the fourth transistor in each of the plurality of switching circuits being connected to the output conductor so as to apply an alternating voltage therethrough when the second transistor is connected to the fourth transistor to provide voltage of the other phase at the output element thereof;
  means for coupling the output conductors of each of the switching circuits, and;
  a capacitor for coupling the output conductor of the last of said switching circuits to the output terminal of the converter to provide at said output terminal analog voltages corresponding to the digital data.

6. A converter as defined by claim 5, including:
  a first resistor connected across the output element of the third transistor and the reference voltage of one phase;
  a second resistor connected across the output element of the third transistor and the output conductor;
  the first and second resistors relating the voltage of the one phase at the output element of the third transistor to the signal corresponding to the predetermined bit of digital data which causes current flow between the input and output elements of the first transistor;
  a third resistor connected across the output element of the fourth transistor and the reference voltage of the other phase;
  a fourth resistor connected across the output element of the fourth transistor and the output conductor, and;
  the third and fourth resistors relating the voltage of the other phase at the output element of the fourth transistor to the signal corresponding to the other predetermined bit of digital data which causes current flow between the input and output elements of the second transistor.

7. A converter as defined by claim 5, including:
  a converter input conductor connected to the reference voltage of one phase;
  a fifth resistor coupling the converter input conductor to the output conductor of the first serially connected switching circuit;
  a sixth resistor coupling the converter input conductor to ground;
  a seventh resistor coupling the output conductor of the last serially connected switching circuit to ground;
  a plurality of eighth resistors, with an eighth resistor coupling the output conductor of a serially connected switching circuit to the output conductor of the next serially connected switching circuit, and;
  the first, second, third, fourth and sixth resistors being related to each of the plurality of eighth resistors in the ratio of 3R to R, the fifth resistor being related to each of the plurality of seventh resistors in the ratio of 6R to R, and the seventh resistor being related to each of the plurality of eighth resistors in the ratio of 2R to R.

References Cited

UNITED STATES PATENTS 3,201,778  8/1965  Portes et al. _____ 340—347
3,223,992  12/1965  Bentley et al. _____ 340—347

MAYNARD R. WILBUR, Primary Examiner

G. R. EDWARDS, Assistant Examiner